United States Patent
Tsai et al.

[11] Patent Number: 5,873,448
[45] Date of Patent: Feb. 23, 1999

[54] AUTOMATED SEPARATING PACKAGING SYSTEM FOR CONTINUOUSLY FEEDING WARP FLAKES

[75] Inventors: Der-Liang Tsai, Putsui; Chiek Kung; Jin-Zun Lin, both of Tainan; Ming-Jyi Jang, Taichung, all of Taiwan

[73] Assignee: Industrial Technology Research Institute, Hsinchu, Taiwan

[21] Appl. No.: 902,982

[22] Filed: Jul. 30, 1997

[51] Int. Cl.$^6$ .................................................. B65G 37/00
[52] U.S. Cl. ...................... 198/360; 198/406; 198/418.9; 198/452
[58] Field of Search ..................... 198/360, 406, 198/408, 418.9, 452; 414/798.4, 798.2

[56] References Cited

U.S. PATENT DOCUMENTS

| | | | |
|---|---|---|---|
| 2,306,431 | 12/1942 | Exley | 414/798.2 |
| 2,391,691 | 12/1945 | Engels | 198/408 |
| 2,580,229 | 12/1951 | Kendall | 198/360 |
| 2,707,924 | 5/1955 | Hansen | 198/406 |
| 3,677,391 | 7/1972 | Schaeffer | 198/35 |
| 4,098,392 | 7/1978 | Greene | 198/425 |
| 4,280,613 | 7/1981 | Stewart | 198/406 |
| 4,947,981 | 8/1990 | Dorner et al. | 198/360 |
| 5,058,725 | 10/1991 | Gamberini et al. | 198/406 |
| 5,365,949 | 11/1994 | Nishizaka et al. | 198/360 |
| 5,615,606 | 4/1997 | Vos | 198/406 |
| 5,630,496 | 5/1997 | Mims | 198/406 |

*Primary Examiner*—David A. Bucci
*Assistant Examiner*—Douglas Hess
*Attorney, Agent, or Firm*—W. Wayne Liauh

[57] ABSTRACT

An automated separating and packaging system for continuously feeding warp flakes mainly makes use of the funnel-shape guiding plates at each of the front end of two tracks respectively to guide the warp flakes into filling conveyers which have partitions set up. Gravitational forces adjust the direction of the flakes along with the orientation guiding plate which slants downward and possesses concave surfaces and has a prop-up device underneath. It also makes use of a reversing conveyer which slants upward to adjust the turning speed in order to control the tangential speed of the flakes escaping from the extremity in order to turn the flakes over by the use of the rotational inertia and the difference in elevation, thereafter, the flakes enter a stack-up conveyer having a photoelectric sensor, and the rear end of the conveyer is connected to a stopping plate which is controlled by the telescopic rod of an actuator to enable it to stack up the flakes into small stacks, carry out partitioning and merge the small stacks from the two tracks by the use of photoelectric sensor and the actuator to control the ascending and descending time of the stopping plate, thereby, to attain the object of the automation for continuously orienting, counting, stacking, separating and merging processes to facilitate the packaging operation in the next stage.

10 Claims, 11 Drawing Sheets

AUTOMATED SEPARATING PACKAGING SYSTEM FOR CONTINUOUSLY FEEDING WARP FLAKES

FIELD OF INVENTION

The present invention is to provide an automated separating and packaging system for continuously feeding warp flakes by using automatic control and guiding elements, which are designed to fit the profile and physical characteristics possessed by the warp flakes, to continuously orient, stack up, separate and merge the flakes that can reduce the cost of labor by using the mode of automated production.

BACKGROUND OF THE INVENTION

In general, flake products having warp surface, especially those which are small in size and light in weight require lots of labor to carry out operations of orientation, feeding, and packaging because of their warp and irregular shapes. Take the mass production of potato chips for example. The conventional method of production is to employ a lot of labor to perform product orientation before the packaging process. As shown in FIG. 1, the potato chips become irregular shapes ( as shown in FIG. 2) after preprocessing 1, and these warp flakes on the metal mesh conveyer 2, which are easily swayed in transverse direction such that they result in their deviating from the tracks of metal mesh conveyer, are to be arranged and conveyed with their concave surfaces facing upward, at this moment, workers 9 are needed on both sides of the rear section of the metal mesh conveyer 2 to check and rearrange the deviated flakes. As the flakes fall over from conveyer 3 which has a elevation difference comparing with conveyer 2, by the use of the tangential velocity at the rear end of the metal mesh conveyer 2 and the elevation difference, they are turned over with their concave surfaces facing downward, but since not all of the flakes conveyed on the metal mesh conveyer are axially parallel to their advancing direction which causes part of the flakes being not turned over, thereby, workers 9 are also needed on both sides of the conveyer 3 to assist the turnover and orientation works; thereafter, in order to complete the orientation works, the flakes are conveyed into vibrating plate 4 and are stacked up by means of vibration, but some of the flakes climb up during the stack-up process, therefore, workers 9 are again needed to rearrange them in a front-to-rear stack-up mode, besides, workers 9 are also needed at the rear end of the vibrating plate 4 to move the stack-up flakes to conveyers 5 and 6 respectively and the partition pins are used to measure the number of flakes for each of the small stack of flakes to be conveyed to the packaging machines 7 to facilitate the packaging operation. This kind of operation mode is not economical under the condition of continuous mass production since the cost of employed labor is significant.

For these reasons, the inventors, through years of working experience with continuous studies and designs, finally developed an automated separating and packaging system that can perform orientating, stack-up, separating and merging processes to effectively improve the shortcoming of high labor cost and greatly elevates the production efficiency.

SUMMARY OF THE INVENTION

The primary objective of the present invention is to provide an automated separating and packaging system for continuously feeding warp flakes which mainly makes use of the funnel-shape guiding plates at each of the front end of two tracks respectively to guide the warp flakes to enter into the filling conveyers which are installed with partition plates. By the orientation guiding plate which slants downward and has concave surfaces, it further makes use of the gravitational force to adjust the orientation of the flakes. Besides, it also makes use of a reversing conveyer which slants upward to adjust the turning speed to control the tangential velocity for the flakes to separate at the rear end to turn the flakes with an angle of 180-degree over by the use of the gravitational force and the elevation difference, thereafter, the flakes enter a stacking up conveyer having a photoelectric sensor and the conveyer is connected at its rear end to a stopping plate controlled by the telescopic rod of an actuator and through the signal transmission of the photoelectric sensor toward the programmable controller to enable the actuator to control the ascending time interval of the stopping plate to stack up the flakes into small stacks when the stopping plate is ascending and to convey the small stacks to the conveyer in the rear to carry out the packaging operation when the stopping plate is descending; by the use of a photoelectric sensor, a programmable controller and an actuator, the system can perform automated continuous operation of orientating, reversing, counting, stacking and separating the flakes such that it greatly reduces the cost of labor so as to attain the object of production automation.

Another objective of the present invention is to provide an automated separating and packaging system for continuously feeding warp flakes where the separating and packaging system consists of two groups of conveying tracks and, by the use of the funnel-shape guiding plate at the end of the tracks, to merge the warp flakes into small stacks which are accomplished at each of the conveying tracks, then, through the parametric adjustment of the programmable controller and by the mode of partitioning, it makes them enter together into the packaging operation so that through the effective and precise time control, it makes the most of the stack-up idle time of each of the conveying tracks to carry out continuous packaging operation.

One more objective of the present invention is to provide an automated separating and packaging system for continuously feeding warp flakes where there is a set-up or prop-up device, which is driven by a pneumatic cylinder, connected to some-where below the orientation guiding plate. The prop-up device can be controlled to act by the programmable controller. If there is any deviation occurring to the flakes during the conveying process, the prop-up device will be caused to raise up to let the flakes drop from the filling conveyer into the collector to attain the object of emergent discharge.

DETAILED DESCRIPTION OF THE INVENTION

Figure 1:
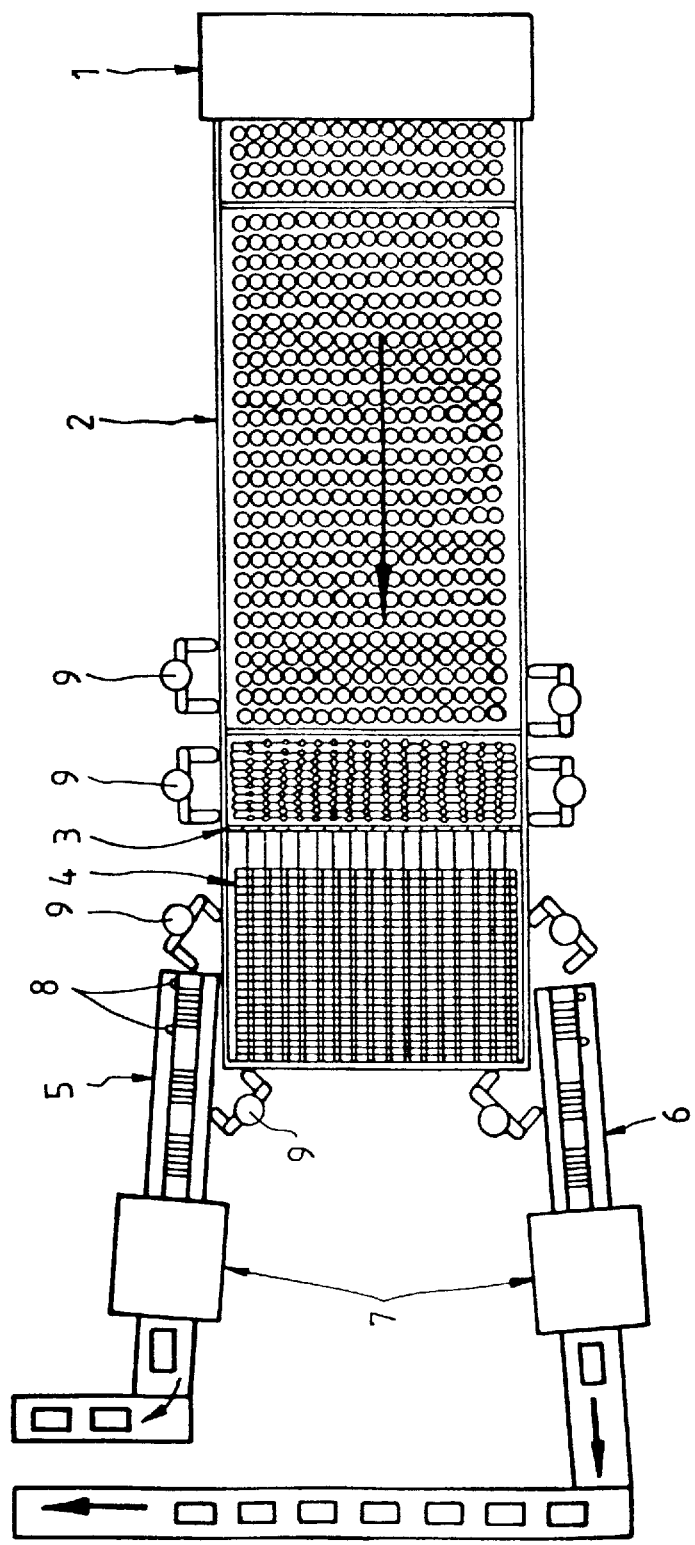
FIG. 1 is the schematic diagram of the separating device of the warp flakes of the prior art.
Figure 2:
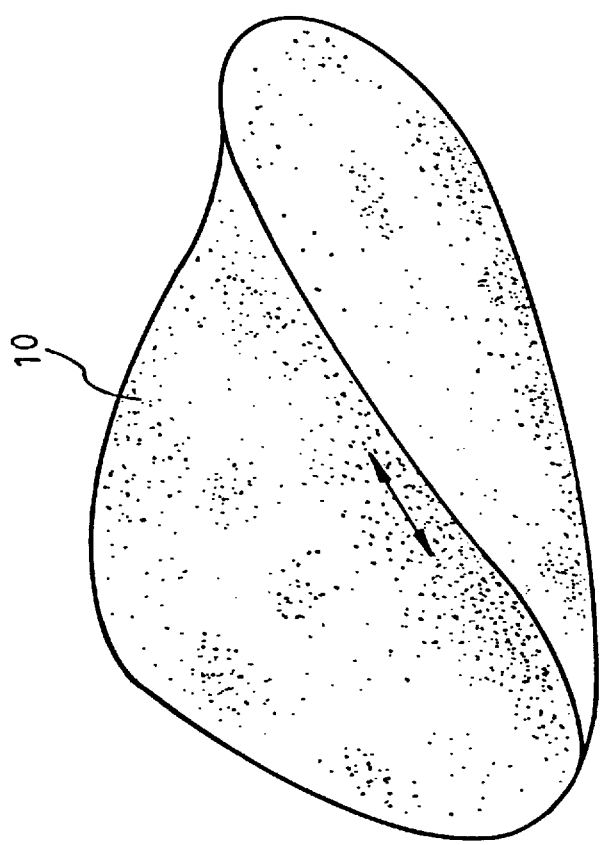
FIG. 2 is the outside of a flake ( i.e. a potato chip).
Figure 3:
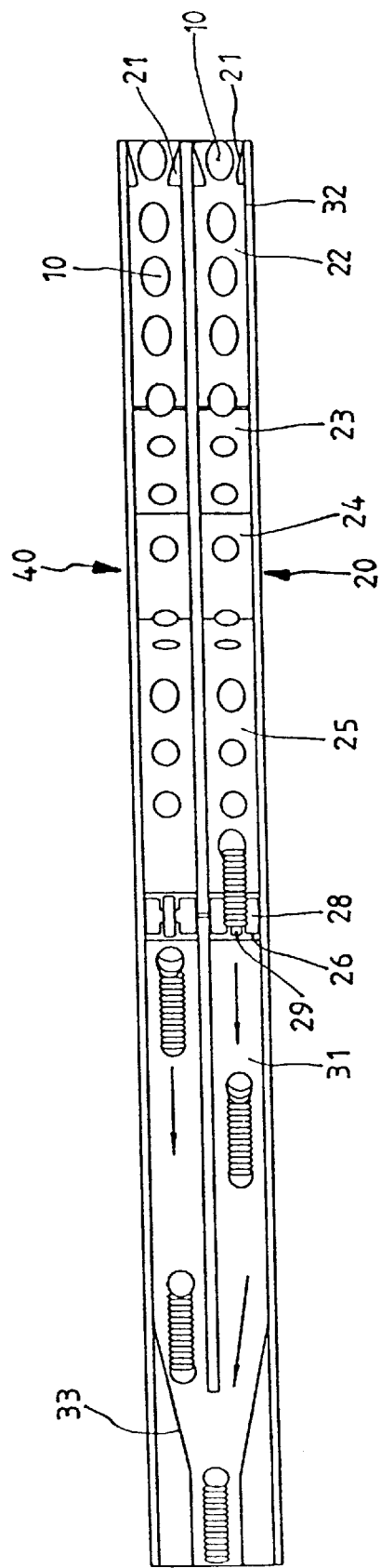
FIG. 3 is the schematic top view of the system of the present invention.
Figure 4:
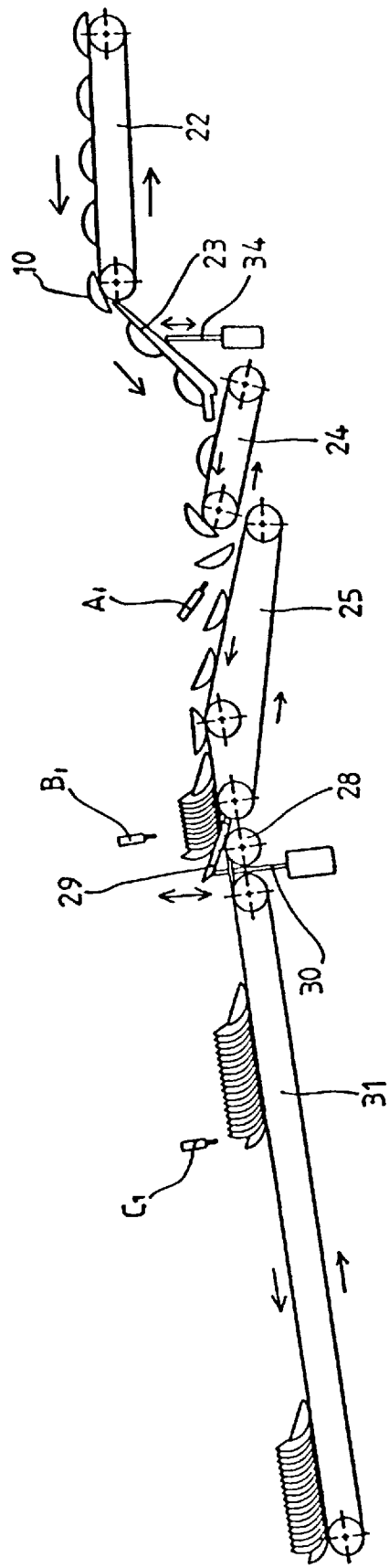
FIG. 4 is the schematic side view of the system of the present invention.
Figure 5:
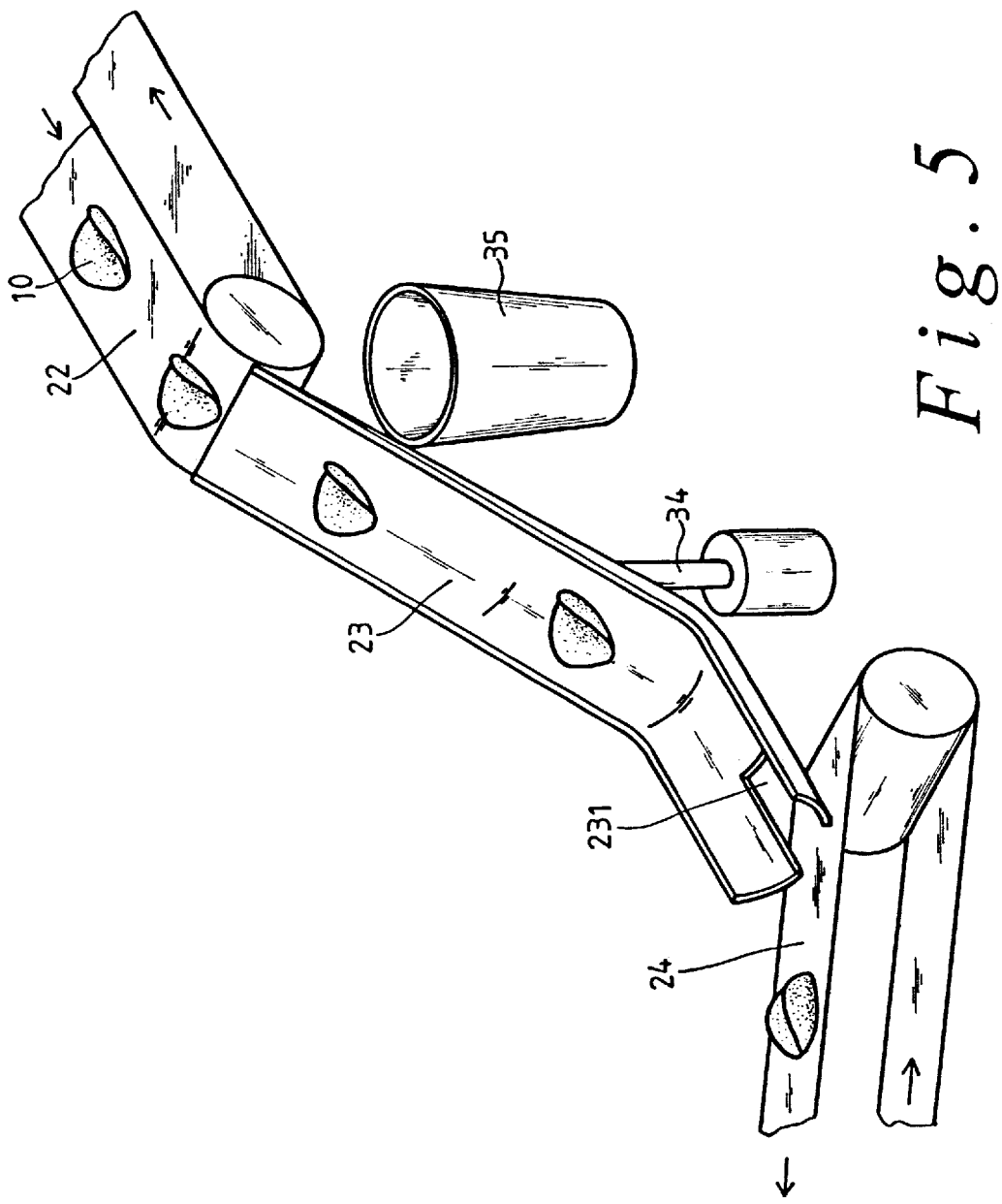
FIG. 5 is the schematic diagram in orientation state of the present invention.
Figure 6:
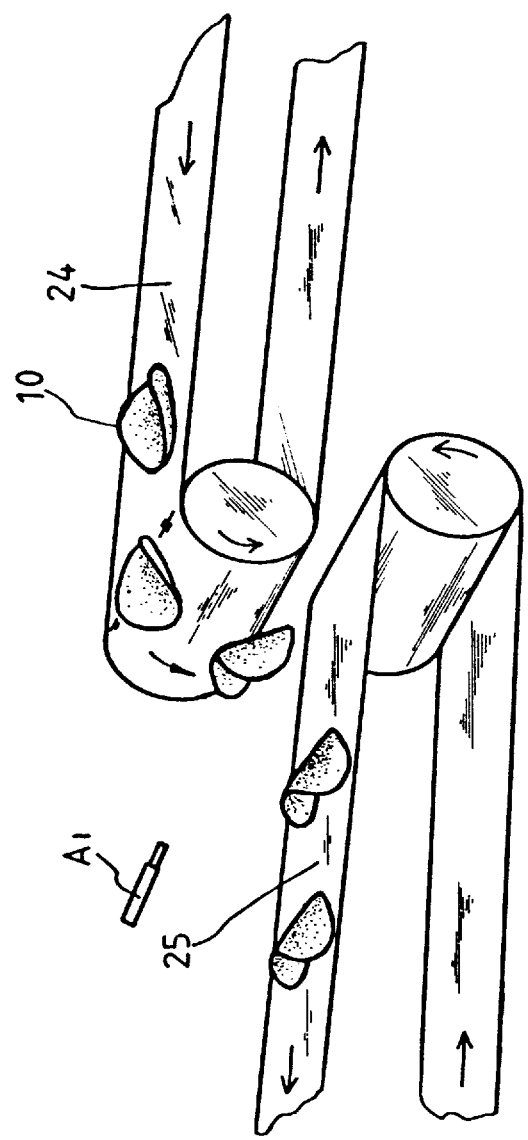
FIG. 6 is the schematic diagram in reversing state of the present invention.
Figure 7:
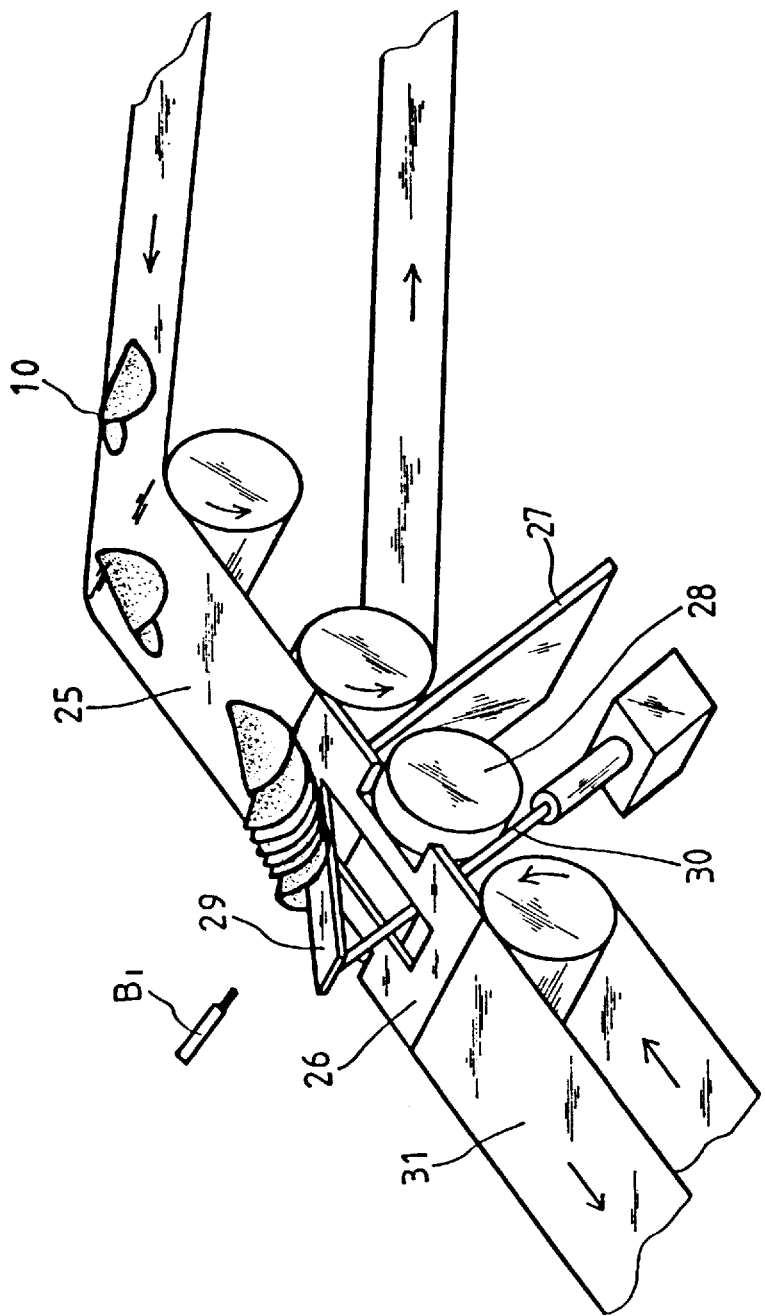
FIG. 7 is the schematic diagram in stack-up state of the present invention.
Figure 8:
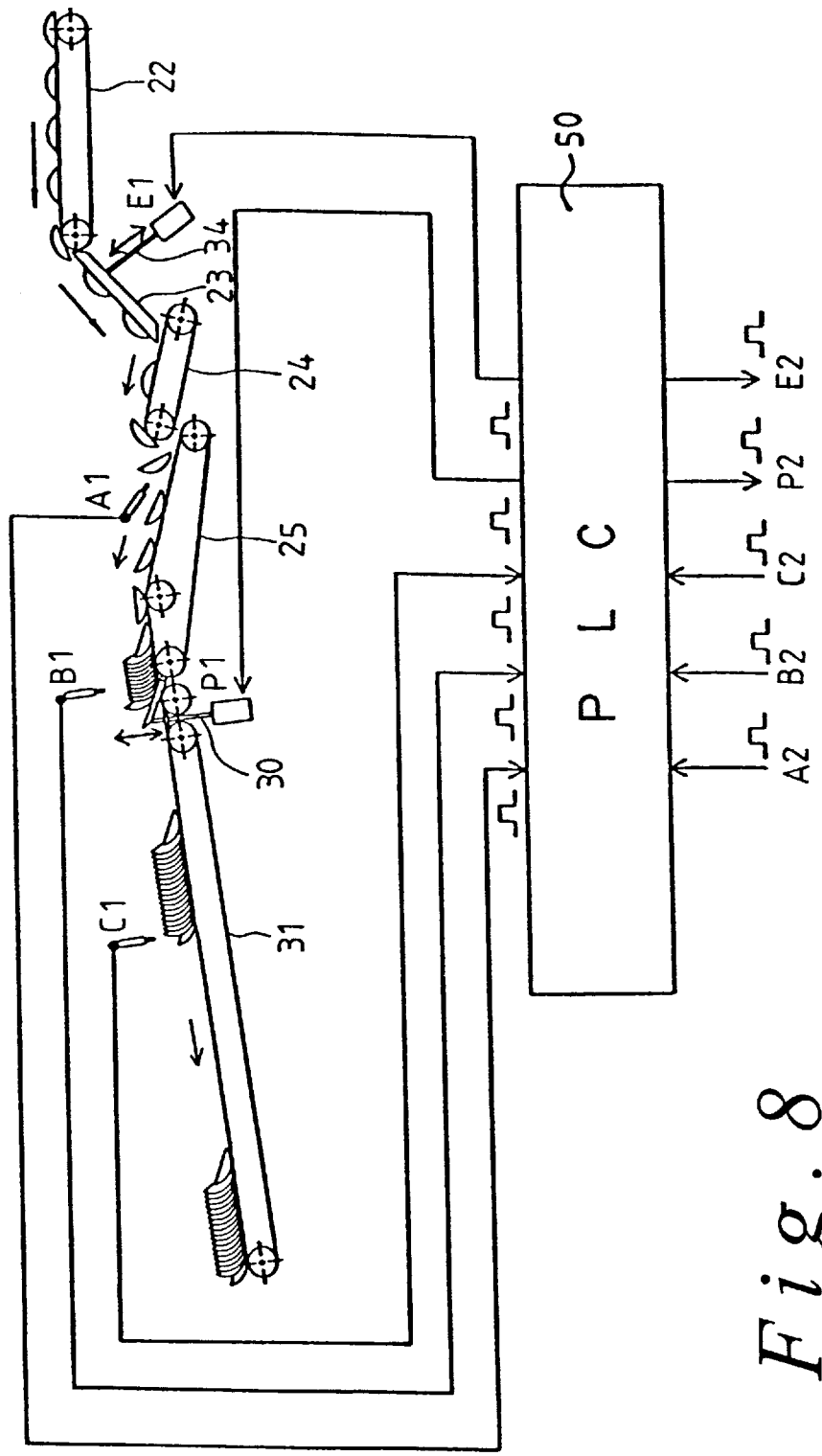
FIG. 8 is the control system layout of the present invention.
Figure 9:
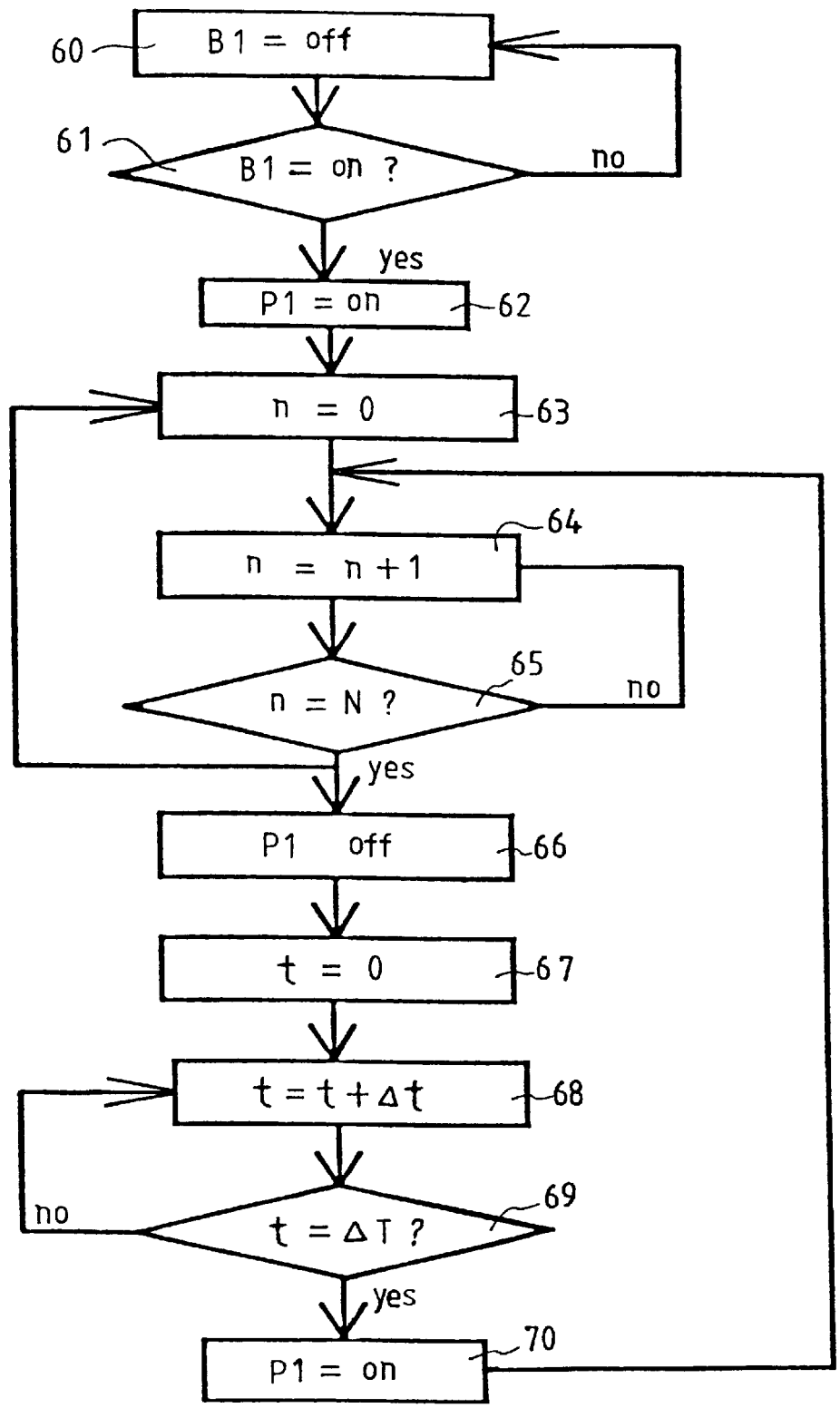
FIG. 9 is the flow chart of the material conveying and actuation system of the present invention.
Figure 10:
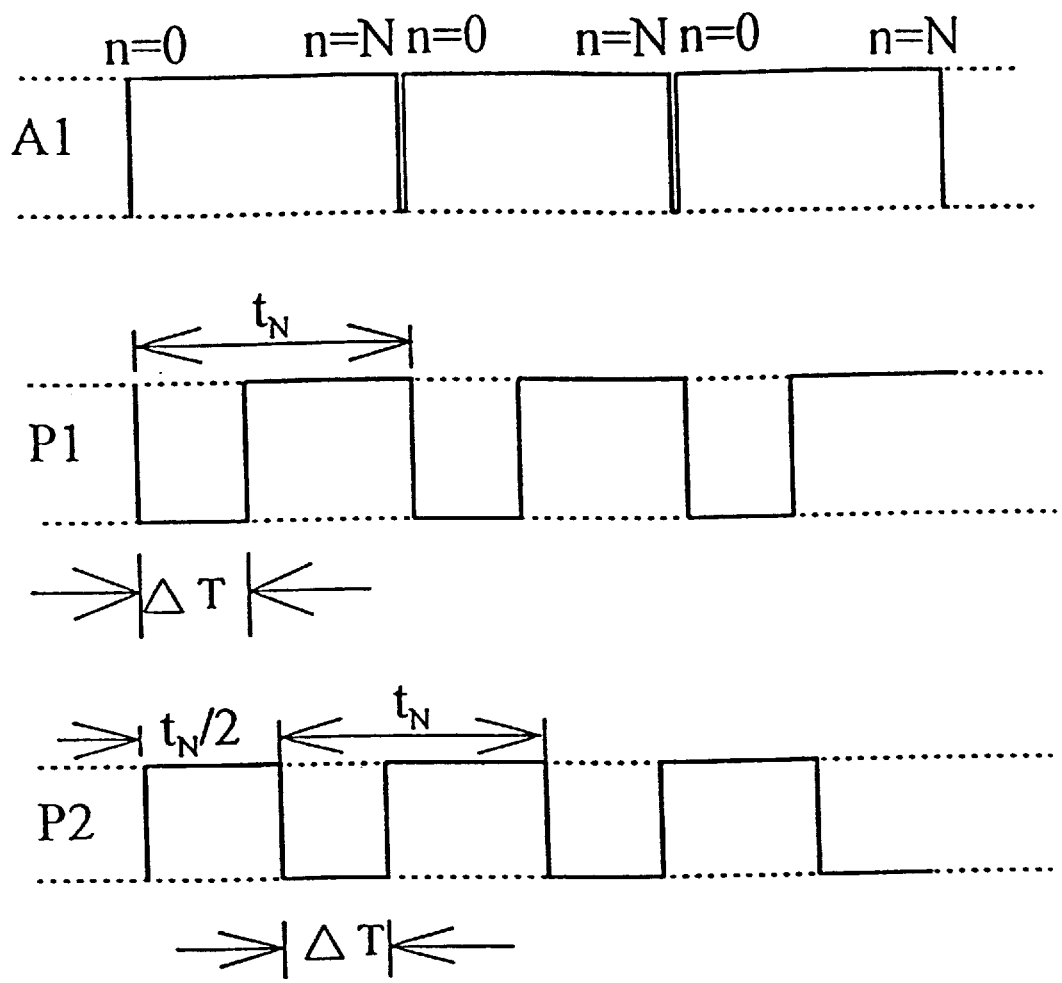
FIG. 10 is the action time-history of the first and second track of the present invention.

As shown in FIG. 2, the flakes become a warp shape after the preprocessing. It needs the process of orientating, counting, stacking and separating to start the packaging operation. As shown in FIGS. 3, 4 and 5, after the flakes 10 have been completed in preprocessing, they will be conveyed into the present system with their concave surfaces facing upward. The present invention consists of conveying tracks 20 and 40 of two groups of identical devices where the front ends of both of the tracks have setup of funnel-shape guiding plates 21 that can guide the flakes into the filling conveyers 22. With their concave surfaces facing upward, they are swaying on the conveyers 22 during the conveying process, therefore, they need to be oriented. The orientation guiding plate 23 having a concave surface with a circular arc as shown in FIG. 4 is slanted downward. It will enable those flakes whose axes (as shown in FIG. 2) are not parallel to the advancing direction to be guided and corrected. Also, there is an opening slot 231 ( as shown in FIG. 5 ) set up at the end of the guiding plate 23 to act as a buffer such that due to the inertia action, the flakes will not hit the conveyer 24 to change orientation when they are sliding down the end of the slope of the orientation guiding plate 23. As shown in FIGS. 4 and 6, to slide down from the orientation guiding plate 23 with their axes parallel to the advancing direction, the flakes then enter the reversing conveyer 24. The conveyer 24, being adjustable in turning speed to control the tangential velocity of the flakes seperating from the rear end of conveyer 24, is slanted upward. To make use of the difference in elevation and the rotational inertia, the flakes are turned over at a 180-degree angle and enter the stack-up conveyer 25 with their concave surfaces facing downward and their axes parallel to the advancing direction. As shown in FIGS. 6 and 7, a photoelectric sensor A1 is set up at the front end of the stack-up conveyer 25 to count the number of flakes passing by, and a fixed plate 26 is set up at the rear end of the stack-up conveyer 25 with its one end mounted at the fixed block 27 and its both sides having a recess opening to allow the top portion of the transmission roller 28 to be exposed up the fixed plate 26, a stopping plate 29 is installed at the center opening of the fixed plate 26 and is pivoted at the top end of the fixed block 27, it further connects from its bottom end to a telescopic rod 30 which is controlled by a programmable controller 50 (FIG. 8). As the telescopic rod 30 is extended, the stopping plate 29 will be pushed to open up to pivot the top of the fixed block 27 and become slanted, at this moment, the flakes will be pitching rather than swaying since they are on the stack-up conveyer 25 with their concave surfaces facing downward; as soon as the stopping plate 29 is slanting up, the flakes, being blocked by it, are stacked up piece by piece until they become a small stack as the telescopic rod 30, which receives signals transmitted from a photoelectric sensor B1 to a programmable controller 50, is made to pull down when the elevating time interval of the telescopic rod 30 is reached. The small stack of flakes will continue to be conveyed forward by means of the driving force from the transmitting roller 28 and the pushing force from the flakes behind. The flakes will be stopped to stack up again when the telescopic rod 30 is raised up again, in this way, the flakes will be separated into several small stacks and finally enter into the merging conveyer 31. As shown in FIGS. 7 and 8, there is a photoelectric sensor C1 to detect the passing status of the small stacks; there is also a funnel-shape guiding plate 33 (FIG. 3) to merge the small stacks from the two tracks into the next stage of the packaging operation by the mode of partitioning. There are photoelectric sensors A1, B1, C1 and A2, B2, C2 on both sides of the conveyer tracks 20 and 40 respectively. They jointly transmit the signals detected to the programmable controller 50 to perform calculation and the operation of controlling the actions of P1, E1 and P2, E2. The symbols in FIGS. 9 and 10 are explained as follows:

A1: the counting photoelectric sensor on the stack-up conveyer of track 20.

B1: the stack-up area photoelectric sensor on the fixed plate of track 20.

P1: the actuator of the telescopic rod of the stopping plate on track 20.

P2: the actuator of the telescopic rod of the stopping plate on track 40.

n: the number of flakes detected by the photoelectric sensor A1.

N: preset total number of flakes.

P1=ON→telescopic rod is raising

P1=OFF→telescopic rod is lowering t: the time interval between the raising and lowering of the telescopic rod.

ΔT: adjusting parameter used to control the time required for the number of passing flakes.

$t_N$: time required for the number of flakes accumulated in the counting photoelectric sensor.

$t_N/2$: the phase difference of signal P2 and P1.

Figure 11:
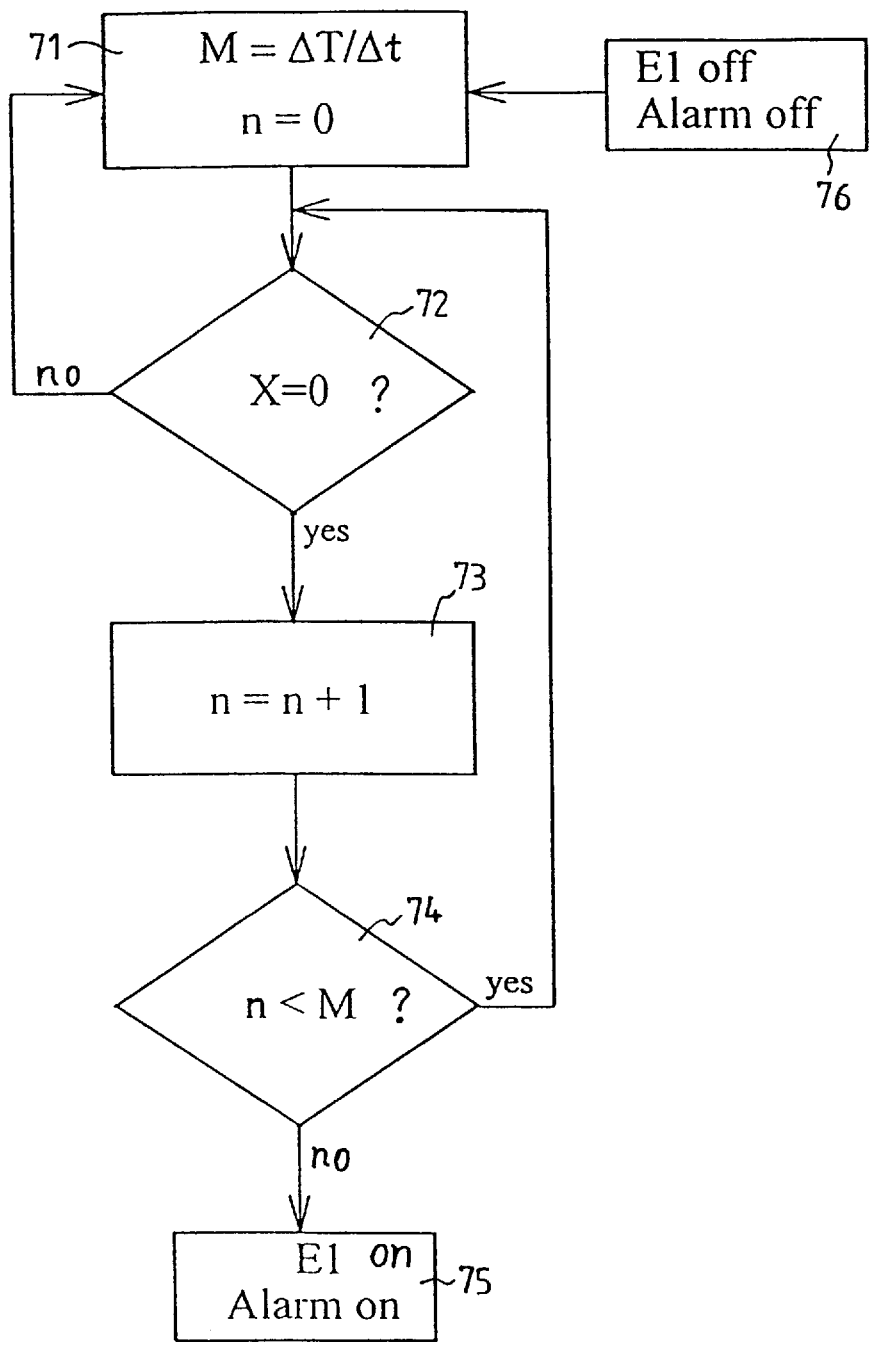
FIG. 11 is the flow chart of the emergent discharge system of the present invention

As shown in the flow chart of FIG. 9, photoelectric sensor B1 of the fixed plate stack-up area on track 20 is in off state (60), then the photoelectric sensor B1 is instructed to turn on (61) , as the photoelectric sensor is confirmed to be on, the telescopic actuator P1 on the track 20 is started to raise the telescopic rod (62), at this moment, the counting photoelectric sensor A1 of the stack-up conveyer on the track 20 begins to count by starting from zero (63) and to accumulate (64); the value (n) accumulated is used to check against the total number of flakes N through the calculation of the program. If the value is not equal to N, it will continue to perform accumulation until the accumulated N value which is equal to the preset total number N of the flakes, then, the actuator P1 of the telescopic rod will be off and the telescopic rod is instructed to lower (66), also, it will make the counting photoelectric sensor A1 on the conveyer reset to recalculate (63). As the actuator P1 is off and the telescopic rod is lowered, the programmable controller 50 starts to count from zero (67) and accumulate (68). Through calculating and checking (69) of the program, if the accumulated t value is not equal to the preset time ΔT, it will continue to perform accumulation (68) until the accumulated t value equal to the preset time ΔT, it will then instruct the actuator P1 of the telescopic rod (70) to be on and make the telescopic rod (70) raise to attain the object of stacking the small stacks and separating work, and keep on the recycling work of counting number and time. As shown in FIG. 10, when track 20 and track 40 perform common action, the action control of track 40 is similar to that of track 20, and the time of the counting photoelectric sensors of both tracks 20 and 40 are all equal to $t_N$ and adjusting parameters are all equal to $t_T$, therefore, if the signal phase difference of P1 and P2 are adjusted to $t_N/2$, one can separate the operating pattern of both of the tracks to enable the flakes to enter in sequence into the stage of the packaging operation without interfering and overlapping. As shown again in FIG. 5, there is another setup of a prop-up device 34 which is also controlled to act by the programmable controller 50, as it extends, it will cause the orientation guiding plate 23 to raise so as to make it separate from the filling conveyer 22 and the flakes will drop into the collector 35. This device is used for emergent discharge of flakes when the system is out of order. As shown in FIG. 11, the symbols are explained as follows:

Δt: detecting period of photoelectric sensors A1, B1, and C1(Second).

ΔT: adjusting parameter.

M: number of times of detecting of the sensor within the preset detecting time.

n: the number of times of detecting of the photo-electric sensor.

X=0: means flakes passing-by are not detected by the sensor.

X=1: means flakes passing-by are detected by the sensor.

E1=ON→Orientation guiding plate is raising.

E1=OFF→Orientation guiding plate is lowering.

In the flow chart of the emergent discharge system as shown in FIG. 11, in normal condition, actuator E1 is off, the alarm is also off (76); as the operation starts, an adjusted parameter of detecting time ΔT is set in the program and a setting number of times of detecting can be obtained to be used as a judging value, at this moment, the photoelectric sensor starts to count from zero (71); as the photoelectric sensor starts to detect, the detected results can be obtained (72), if there are any passing-by flakes detected it will be reset to count over (71) but if there are no flakes detected, the number of times of detecting n (73) of the photoelectric sensor starts to accumulate, and since an adjusted parameter ΔT of detecting time is set in the program and a number of setting detecting times M is obtained to be used as a judging value, therefore, under the condition that no flakes are passing by, the setting number of times of detecting is compared with the accumulated number of times n already detected (74), if n is still smaller than M, then it will continue to detect (72), but if n is greater than M, then, the actuator E1 is instructed to turn on, the prop-up device is turn on and the alarm 75 is also triggered; that is, the actuator of the emergent discharging system E1 will be started and the alarm will be worked if no flakes passing by are detected by the photoelectric sensor within ΔT seconds, in order to attain the object of emergent discharge and thereby, to obtain the system automation of controlling the flakes being converyed.

To summarizing the above-mentioned statements, it is known that in accommodating the calculation and control of the programmable controller, the mechanism design of the present system can manage the flake products to perform continuous orientating, counting, stack-up, separating and merging process, to attain a sufficient effect of automation which can be applied to food products and other merchandise having characteristics of adequate shapes, light in weight, slice-arranged production, production of continuous pressing dies and mass production, such as potato chips, biscuits and "can food" production which is really practical and progressive with commercial value.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. An automated separating and packaging system for warp flakes having concave surfaces, the system comprising:

a filling conveyor in horizontal position having a guiding plate set up at the filling conveyor's front end in order to guide the warp flakes which have their concave surfaces facing upward;

an orientation guiding plate slanted downward with its front end connected to said filling conveyor and an underside of said orientation guiding plate connected to a prop-up device which includes an actuator connected to a programmable controller, the orientation guiding plate uses gravity to orient those flakes which do not have a direction axes parallel to an advancing direction;

a reversing conveyor slanted upward with its front end connected to said orientation guiding plate, the reversing conveyor makes use of a tangential velocity and an elevation difference as well as a change of the flake's center of gravity to turn the warp flakes 180 degrees over so that the concave surface is facing downward;

a stack-up conveyor with its front end connected to said reversing conveyor, above the stack-up conveyor is a counting photoelectric sensor, the sensor transmits signals to said programmable controller to convey flakes which have their concave surface facing downward;

a stack-up mechanism with its front end connected to said stack-up conveyor, the stack-up mechanism comprising a fixed plate comprising a middle hollow portion for accepting a rotating stopping plate, recesses on both sides of the plate for accommodating rollers, and ends of the fixed plate mounted on a fixed block, the underside of the stopping plate is connected to a telescopic rod which communicates with the programmable controller and with a photoelectric sensor located above the stack-up mechanism, the stopping plate moves in an ascending and descending motion for sequentially stacking the warp flakes into a series of separate small stacks;

a merged flow conveyor with its front end connected to said fixed plate, a photoelectric sensor located above the merged flow conveyor and connected to the programmable controller, the merged flow conveyor for merging the smaller stacks into a packaging machine; and the programmable controller for carrying out calculations and controlling the entire separating and packaging system.

2. An automated separating and packaging system of warp flakes as claimed in claim 1, wherein said guiding plate of the front end of said filling conveyor is designed to be a funnel shape such that flakes will be guided into the conveyer.

3. An automated separating and packaging system of warp flakes as claimed in claim 1, wherein said orientation guiding plate is designed to be a concave surface with a circular arc such that the direction axes of the flakes will be guided to be parallel to the advancing direction.

4. An automated separating and packaging system of warp flakes as claimed in claim 1, wherein the rear end of said orientation guiding plate has an empty slot to prevent the flakes from changing orientation when they slide downward.

5. An automated separating and packaging system of warp flakes as claimed in claim 1, wherein a collector is set up below said orientation guiding plate to collect emergent discharge of flakes when the system is out of order.

6. An automated separating and packaging system of warp flakes as claimed in claim 1, wherein a turning speed of said reversing conveyer is adjustable to control the tangential velocity such that the flakes will be turned over by 180-degrees.

7. An automated separating and packaging system of warp flakes as claimed in claim 1, wherein the stack-up mechanism comprises transmission rollers which can be connected to turning wheels of the merging conveyor by any power transmission.

8. An automated separating and packaging system of warp flakes as claimed in claim 1, wherein the guiding plate of the rear end of said merging flow conveyer is designed to be a funnel shape.

9. An automated separating and packaging system of warp flakes as claimed in claim 1, wherein two or more groups of identical conveying tracks can be combined to operate with each of the photoelectric sensors connected to the programmable controller.

10. An automated separating and packaging system of warp flakes as claimed in claimed 9, wherein controlling signals of the stack-up mechanism may possess phase difference amongst the at least two groups of conveying tracks, possesses phase difference.

* * * * *